United States Patent [19] … [11] Patent Number: 5,464,881
Henn et al. … [45] Date of Patent: Nov. 7, 1995

[54] EXPANDABLE STYRENE POLYMERS OF HIGH HEAT RESISTANCE

[75] Inventors: Rolf Henn, Ketsch; Siegmund Besecke, Hameln; Andreas Deckers, Ludwigshafen; Norbert Guentherberg, Speyer; Martin Brudermueller, Mannheim; Gerhard Nestler, Ludwigshafen; Karl-Heinz Wassmer, Limburgerhof, all of Germany

[73] Assignee: BASF Aktiengesellschaft, Ludwigshafen, Germany

[21] Appl. No.: 343,567

[22] PCT Filed: May 17, 1993

[86] PCT No.: PCT/EP93/01222

§ 371 Date: Nov. 22, 1994

§ 102(e) Date: Nov. 22, 1994

[87] PCT Pub. No.: WO93/24561

PCT Pub. Date: Dec. 9, 1993

[30] Foreign Application Priority Data

May 26, 1992 [DE] Germany ............ 42 17 383.3

[51] Int. Cl.$^6$ ............................................. C08J 9/16
[52] U.S. Cl. .................. 521/60; 521/56; 521/79; 521/81; 521/147
[58] Field of Search ............... 521/79, 81, 147, 521/56, 60

[56] References Cited

U.S. PATENT DOCUMENTS

| | | | |
|---|---|---|---|
| 3,208,444 | 1/1965 | Ganzles et al. ............... | 521/149 |
| 3,468,820 | 9/1969 | Buchholt et al. ............... | 521/59 |
| 3,489,700 | 1/1970 | Kanai et al. ............... | 521/85 |
| 3,513,112 | 5/1970 | Kanai et al. ............... | 521/117 |
| 3,553,160 | 1/1971 | Schroeder et al. ............... | 526/240 |
| 3,734,870 | 5/1973 | Schroëder et al. ............... | 521/58 |
| 4,298,703 | 11/1981 | DiGiulio et al. . | |
| 5,116,907 | 5/1992 | Baumgartner et al. ............... | 525/77 |

FOREIGN PATENT DOCUMENTS

| | | |
|---|---|---|
| 294783 | 12/1988 | European Pat. Off. . |
| 336212 | 10/1989 | European Pat. Off. . |
| 63-273612 | 11/1988 | Japan . |

OTHER PUBLICATIONS

Derwent Abst. JP 1 319 546.

Primary Examiner—Morton Foelak
Attorney, Agent, or Firm—Keil & Weinkauf

[57] ABSTRACT

An expandable styrene polymer comprising a) from 0 to 90% by weight of a styrene polymer or styrene copolymer other than b) contains at least 50% by weight of copolymerized styrene, b) from 10 to 100% by weight of a styrene/methacrylamide copolymer comprising from 0.5 to 50% by weight of at least one copolymerized N-substituted methacrylamide of the formula I $$\begin{array}{c} H \\ \diagdown \\ C=C \\ \diagup \\ H \end{array} \begin{array}{c} CH_3 \\ \diagup \\ \diagdown \\ C \\ \diagdown \\ N \\ \diagdown \\ R^2 \end{array} \begin{array}{c} O \\ \\ R^1 \end{array} \quad I$$

where $R^1$ and $R^2$ are identical or different and are hydrogen, $C_1$- to $C_{15}$-alkyl, $C_6$- to $C_{16}$-cycloalkyl or $C_6$- to $C_{20}$-aryl, it being possible, if $R^1$ and $R^2$ contain at least 2 carbon atoms, for at least 2 carbon atoms to be linked via hetero atoms, and c) from 1 to 15% by weight, based on the sum of a) and b), of an aliphatic $C_3$- to $C_9$-hydrocarbon and/or carbon dioxide as blowing agent.

1 Claim, No Drawings

EXPANDABLE STYRENE POLYMERS OF HIGH HEAT RESISTANCE

The present invention relates to expandable styrene polymers of high heat resistance. In particular, the invention relates to expandable styrene polymers of this type which contain styrene-methacrylamide copolymers based on certain N-substituted methacrylamides, to a preferred process for their preparation, and to the foams obtained using these polymers.

Expandable styrene polymers of high heat resistance are disclosed in EP-A 294 783, EP-A 383 133, EP-A 419 966 and U.S. Pat. No. 4,298,703. These polymers contain poly-1,4-phenylene ether, poly-1,4-phenylene sulfide or copolymers of styrene with maleic acid, maleic anhydride or N-substituted maleimide.

However, these known expandable styrene polymers have some disadvantages. For example, copolymers of styrene with N-substituted maleimide can only be foamed by means of an extruder. Our own experiments have shown that the copolymerization of styrene with maleimide in aqueous suspension in the presence of a blowing agent does not give expandable polymers. If poly-2,6-dimethyl- 1,4-phenylene ether (PPE) is used, the moldings obtained have a tendency to gradually yellow. In addition, the preparation and processing of polystyrene/PPE blends or interpolymers to give expandable, spherical beads is relatively complex.

JP-A 63/273 612 discloses a copolymer which comprises methacrylamide, styrene derivatives and acrylonitrile. The copolymer is said to have improved properties with respect to fluidity, transparency, heat resistance, mechanical resistance and yellowing resistance and can be used to produce moldings or foams.

It is an object of the present invention to provide an expandable styrene polymer which does not have the outlined disadvantages.

We have found that, surprisingly, this object is achieved by an expandable styrene polymer comprising a) from 0 to 90% by weight of a styrene polymer or styrene copolymer other than b) containing at least 50% by weight of copolymerized styrene, b) from 10 to 100% by weight of a styrene/methacrylamide copolymer comprising from 0.5 to 50% by weight of at least one copolymerized N-substituted methacrylamide of the formula I

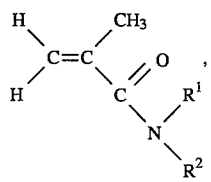

where $R^1$ and $R^2$ are identical or different and are hydrogen, $C_1$- to $C_{15}$-alkyl, $C_6$- to $C_{16}$-cycloalkyl or $C_6$- to $C_{20}$-aryl, it being possible, if $R^1$ and $R^2$ contain at least 2 carbon atoms, for at least 2 carbon atoms to be linked via hetero atoms, and c) from 1 to 15% by weight, based on the sum of a) and b), of an aliphatic $C_3$- to $C_{16}$-hydrocarbon and/or carbon dioxide as blowing agent.

The present invention also provides a process for the preparation of an expandable styrene polymer of this type, which comprises polymerizing a styrene solution of at least one substituted methacrylamide of the formula I

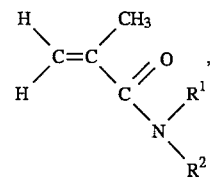

where $R^1$ and $R^2$ are identical or different and are hydrogen, $C_1$- to $C_{15}$-alkyl, $C_6$- to $C_{16}$-cycloalkyl or $C_6$- to $C_{20}$-aryl, it being possible, if $R^1$ and $R^2$ contain at least 2 carbon atoms, for at least 2 carbon atoms to be linked via hetero atoms, and, if desired, a styrene polymer or styrene copolymer containing at least 50% by weight of copolymerized styrene, in aqueous suspension and adding the blowing agent during or after the polymerization.

The present invention furthermore provides a foam having a density of from 0.01 to 0.2 g/cm³, comprising a) from 0 to 90% by weight of a styrene polymer or styrene copolymer other than b) containing at least 50% by weight of copolymerized styrene, b) from 10 to 100% by weight of a styrene/methacrylamide copolymer comprising from 0.5 to 50% by weight of at least one copolymerized N-substituted methacrylamide of the formula I

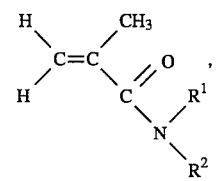

where $R^1$ and $R^2$ are identical or different and are hydrogen, $C_1$- to $C_{15}$-alkyl, $C_6$- to $C_{16}$-cycloalkyl or $C_6$- to $C_{20}$-aryl, it being possible, if $R^1$ and $R^2$ contain at least 2 carbon atoms, for at least 2 carbon atoms to be linked via hetero atoms.

Suitable styrene polymers a) are polystyrene and copolymers containing at least 50% by weight of copolymerized styrene. Examples of suitable comonomers are α-methylstyrene, ring-halogenated styrenes, ring-alkylated styrenes, acrylonitrile, esters of (meth)acrylic acid with alcohols having 1 to 8 carbon atoms, N-vinyl compounds, such as N-vinylcarbazole, and maleic anhydride. The styrene polymer advantageously contains a small amount of a copolymerized crosslinking agent, i.e. a compound containing more than one, preferably two, polymerizable double bonds, such as divinylbenzene, butadiene or butanediol diacrylate. The crosslinking agent is generally used in an amount of from 0.005 to 0.05 mol %, based on styrene. Styrene polymers containing at least 5% by weight, generally from 5 to 17% by weight, preferably 5 to 10% by weight, of copolymerized acrylonitrile give molding compositions which are distinguished by high oil resistance. The styrene polymer used for this purpose is advantageously a mixture of polystyrene and a styrene-soluble styrene-acrylonitrile copolymer, in particular a mixture of from 50 to 83% by weight, preferably from 60 to 80% by weight, of polystyrene and from 17 to 50% by weight, in particular from 20 to 40% by weight, of a styrene-acrylonitrile copolymer containing from about 15 to 35% by weight, in particular from 20 to 30% by weight, of copolymerized acrylonitrile.

The styrene polymer or styrene copolymer a) is used in an amount of from 0 to 90% by weight, preferably from 0 to 50% by weight, in particular from 0 to 20% by weight, based on the sum of a) and b)).

The expandable styrene polymers contain, as constituent b) which is essential to the invention, from 10 to 100% by weight, preferably from 50 to 100% by weight, in particular from 80 to 100% by weight, of a styrene-methacrylamide copolymer comprising from 0.5 to 50% by weight, preferably from 3 to 45% by weight, particularly preferably from 5 to 40% by weight, of at least one copolymerized N-substituted methacrylamide of the formula I

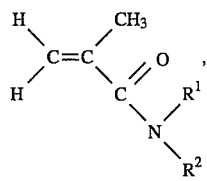

where $R^1$ and $R^2$ are identical or different and are hydrogen, $C_1$- to $C_{15}$-alkyl, $C_6$- to $C_{16}$-cycloalkyl or $C_6$- to $C_{20}$-aryl.

If $R^1$ and $R^2$ contain at least 2 carbon atoms, it is possible for at least 2 carbon atoms to be linked via hetero atoms. Suitable hetero atoms are oxygen, sulfur and nitrogen.

Examples of such substituents $R^1$ and/or $R^2$ are $—CH_2—O—CH_3$, $—CH_2—S—CH_3$, $—C_2H_4—O—CH_3$, $—C_2H_4—O—C_2H_5$ etc.

Preference is given to N-substituted methacrylamides in which $R^1$ is hydrogen and $R^2$ is phenyl, cyclohexyl, benzyl or 1-naphthyl. In a particularly preferred embodiment, $R^2$ is phenyl or cyclohexyl.

The N-substituted methacrylamides of the formula I employed according to the invention are known per se and can be prepared, for example, as described in DE-C 31 30 508, DE-C 28 09 102, DE-C 31 23 970 and DE-C 31 31 096.

The styrene-methacrylamide copolymers according to the invention may in addition contain further comonomers, for example acrylonitrile, acrylates, acrylamides, methacrylates and/or substituted maleimides, in an amount of up to 20% by weight.

The blowing agent c) in the expandable styrene polymers is from 1 to 15% by weight, preferably from 3 to 8% by weight, based on a) and b), of an aliphatic $C_3$- to $C_9$-hydrocarbon (for example propane, butane, isobutane, n-pentane, neopentane and/or hexane) and/or carbon dioxide. If a blowing agent containing or comprising carbon dioxide is used, the expandable styrene polymers preferably contain a carbon dioxide absorber, as described in German Patent Application P 41 37 405.3.

The expandable styrene polymers may furthermore contain conventional additives in effective amounts, such as dyes, fillers, stabilizers, synergists, nucleating agents, lubricants, antistatics, substances which have a non-stick action during foaming, and agents for shortening the demolding time on final foaming.

According to DE-C 39 15 602, suitable additives also include styrene-soluble elastomers. These additives increase the elasticity of the foam.

The expandable styrene polymers are generally in the form of beads and advantageously have a mean diameter of from 0.1 to 6 mm, in particular from 0.3 to 3 mm.

The expandable styrene polymers according to the invention are preferably prepared by suspension polymerization in the presence of initiators which form free radicals (for example peroxides). To this end, styrene, at least one N-substituted methacrylamide of the formula I and, if desired, further comonomers and/or a styrene polymer or copolymer a) are polymerized in aqueous suspension, expediently with addition of a conventional suspension auxiliary.

Styrene, at least one N-substituted methacrylamide of the formula I, and, if desired, further comonomers can be introduced into the reactor at the beginning of the polymerization or added to the polymerization batch at various times and in various sequences. In a preferred procedure, styrene, at least one N-substituted methacrylamide and, if desired, further comonomers are introduced into the polymerization reactor with the polymerization initiator at the beginning of the polymerization.

However, it is also possible for a styrene-methacrylamide copolymer comprising from 0.5 to 50% by weight of at least one copolymerized N-substituted methacrylamide of the formula I to be dissolved in styrene and subsequently polymerized in aqueous suspension.

It is advantageous to add a regulator or a small amount, for example from 0,005 to 0.05 mol %, based on styrene, of a crosslinking agent during the polymerization. The blowing agent and any additives used can be added to the batch before, during or after the polymerization.

When the polymerization is complete, the beadform, expandable styrene polymers obtained are separated from the aqueous phase, washed and dried.

For the preparation of foams, the expandable styrene polymers are expanded in a known manner by heating to above their softening point, for example by means of hot air or preferably by means of steam. After cooling and, if desired, after interim storage, the foam particles obtained can be foamed further by re-heating. They can subsequently be welded in a known manner in molds which do not seal in a gas-tight manner, giving moldings.

The foams obtained have a density of from about 0.01 to 0.2 $g/cm^3$.

The expandable styrene polymers according to the invention and the foams obtainable using these polymers have numerous advantages.

For example, the expandable styrene polymers according to the invention have improved foamability (i.e. a lower minimum bulk density for the same blowing agent content). They can be prepared in bead form by polymerization in aqueous suspension, have a low residual monomer content, are white and have no tendency toward yellowing. They can be expanded using the conventional amount of blowing agent or an amount which is lower than that required for expandable particles of PPE/PS blends or interpolymers, giving preformed particles which can be welded using conventional technology to give moldings.

The foams obtained using the expandable styrene polymers according to the invention have high heat resistance, a high proportion of welded beads, a high Vicar softening point, an improved cell structure, an extremely low tendency toward yellowing and a surprisingly high oil resistance.

Compared with heat-resistant, expandable styrene polymers based on polyphenylene ethers, the expandable styrene polymers according to the invention are distinguished by the simpler way in which they can be prepared. For example, the solutions obtained on dissolution of a PPE/polystyrene blend (90% by weight of PPE) in styrene have a higher, disadvantageous viscosity. In addition, free-radical polymerization is inhibited, at least in some cases, by the presence of PPE.

EXAMPLES

The expandable styrene polymers of Examples 1 to 8 and Comparative Examples 1 to 4 were prepared by suspension polymerization in the presence of a blowing agent, and the expandable styrene polymers of Comparative Examples 5 to 7 were prepared in suspension by post-impregnation with the blowing agent. The conversion of the expandable styrene polymers into moldings and the determination of the respective properties was carried out in the same way as described in Example 1, unless otherwise evident from the context.

The N-substituted methacrylamide used in the examples according to the invention was N-phenylmethacrylamide (Examples 1 to 6) or N-cyclohexylmethacrylamide (Examples 7 and 8).

The comparative examples used expandable styrene polymers whose polymer component comprised polystyrene (Comparative Example 1), copolymers of styrene with various proportions of N-p-tolylmaleimide (Comparative Examples 2 to 4) or PPE/polystyrene mixtures containing various proportions of PPE (Comparative Examples 5 to 7).

The composition of the polymers is given in Table 1. The blowing agent content in the expandable styrene polymers was 5.5% by weight in each case, based on the polymer component. The properties measured for the expandable styrene polymers or the moldings produced therefrom are given in Table 2. Percentages are by weight.

EXAMPLE 1

A mixture of 9450 g of styrene, 1050 g of N-phenylmethacrylamide, 9.70 g of dibenzoyl peroxide, 25.73 g of t-butyl perbenzoate, 21 g of dicumyl peroxide and 69.3 g of hexabromocyclododecane were added to a solution of 21 kg of water, 16.8 g of $Na_4P_2O_7$ and 27.1 g of $MgSO_4 \cdot 7H_2O$ in a pressure-tight reactor having a capacity of 40 l. The stirred mixture was heated to 85° C. over the course of 3 hours, and subsequently to 115° C. over the course of 5 hours and was then kept at this temperature for a further 5 hours. 85 minutes after the temperature had reached 80° C., 523 g of a 10% strength aqueous solution of polyvinylpyrrolidone (Fikentscher K value=90) were added, followed, after a further 110 minutes, by 798 g of pentane.

When the polymerization was complete (after a total of 13 hours), the reactor contents were cooled to 20° C. and discharged, and the beads obtained were separated from the serum by means of a sieve having a mesh width of 0.05 mm and washed thoroughly.

The bead polymer obtained, having a mean particle diameter d' of 1.29 mm and a distribution width β of 19.4° (in each case determined by the method of Rosin-Rammler-Sperling-Bennett as described in DIN 66145), was isolated and dried.

The expandability was analyzed using a metal-framed sieve (mesh width: from 0.1 to 0.2 mm) having the dimensions 1000×800×250 mm which was located in a sealed metal housing with steam inlet and extractor.

The steam at 120° C. was passed into the prefoaming apparatus from below, passed through the wire mesh holding the products to be tested and escaped again through the extractor. Before the tests were commenced, the apparatus was first preheated for about 5 minutes. 100 g of the expandable bead polymers having a particle diameter of from 1.0 to 2.0 mm were subsequently distributed uniformly on the mesh, the apparatus was sealed, and the steam valve was opened. The bead polymers were treated with steam under atmospheric pressure for a defined time. The steam valve was then closed again, and the metal housing was opened. The prefoamed material was dried for 24 hours in air (20° C./50% relative humidity), and the bulk density was determined.

By varying the conditions, the minimum achievable bulk density was determined.

In order to produce moldings, prefoamed beads having a bulk density of from 15 and 30 g/l were stored for 12 hours and then introduced into a mold measuring 20×20×4 $cm^3$. The base and lid, each having an area of 20×20 $cm^2$, had uniformly distributed through-holes, through which the steam was passed at from 107° to 130° C. On further expansion and welding of the beads, moldings were obtained.

The moldings were analyzed for heat distortion resistance (HDR) in accordance with DIN 53 424 under compression. The Vicar B softening point was determined by method B/50 described in DIN 53 460 using samples which, in order to remove the blowing agent, had been dissolved in dichloromethane, were reprecipitated using methanol, dried and subsequently pressed to give tablets 5 mm in thickness (diameter 2 cm).

The melt viscosity MVI was determined in accordance with DIN 53 735 J at 210° C. using a load of 10 kp. Comparative Examples 6 and 7 were carried out in accordance with DIN 53 735 U at 220° C. using a load of 10 kp.

The viscosity was measured on 0.5% strength solutions in toluene (Comparative Examples 2 and 4 in THF).

EXAMPLE 2

The procedure was similar to that of Example 1, but 8925 g of styrene and 1575 g of N-phenylmethacrylamide were used.

EXAMPLE 3

The procedure was similar to that in Example 1, but 8400 g of styrene and 2100 g of N-phenylmethacrylamide were used. In addition, the polyvinylpyrrolidone was added 80 minutes after the temperature had reached 80° C.

EXAMPLE 4

The procedure was similar to that of Example 1, but 7350 g of styrene and 3150 g of N-phenylmethacrylamide were used. In addition, the polyvinylpyrrolidone was added 75 minutes after the temperature had reached 80° C.

EXAMPLE 5

A mixture of 13140 g of styrene, 1460 g of N-phenylmethacrylamide, 17.96 g of dibenzoyl peroxide, 36.5 g of t-butyl perbenzoate, 29.2 g of dicumyl peroxide and 96.36 g of hexabromocyclododecane were added to a mixture of 16 kg of water, 12.8 g of $Na_4P_2O_7$, 20.64 g of $MgSO_4 \cdot 7H_2O$ and 0.32 g of $(NH_4)_2SO_4$ in a pressure-tight reactor having a capacity of 40 l. The mixture was heated, with stirring, to 85° C. over the course of 3 hours and subsequently to 115° C. over the course of 5 hours and was then kept at this temperature for a further 5 hours. 85 minutes after the temperature had reached 80° C., 398.4 g of a 10% strength aqueous solution of polyvinylpyrrolidone (K value 90) were added. After a further 110 minutes, 1109.6 g of pentane were added to the reactor.

EXAMPLE 6

A mixture of 9450 g of styrene, 1050 g of N-phenylmethylmethacrylamide [sic], 13.40 g of dibenzoyl peroxide and 25.20 g of t-butyl perbenzoate, were added to a mixture of 21 kg of water, 21.0 g of $Na_4P_2O_7$ and 33.6 g of $MgSO_4 \cdot 7H_2O$ in a pressure-tight reactor. The mixture was heated, with stirring, to 90° C. over the course of 3 hours and subsequently to 120° C. over the course of 5 hours and was then kept at this temperature for a further 4 hours. 95 minutes after the temperature had reached 80° C., 1029 g of a 10% strength aqueous solution of polyvinylpyrrolidone (Fikentscher K value 90) were added. After a further 100 minutes, 798 g of pentane were added to the reactor.

EXAMPLE 7

The procedure was similar to that of Example 1, but 8400 g of styrene and 2100 g of N-cyclohexylmethacrylamide were used. In addition, the polyvinylpyrrolidone was added 80 minutes after a temperature of 80° C. had been reached.

EXAMPLE 8

The procedure was similar to that of Example 1, but 7350 g of styrene and 3150 g of N-cyclohexylmethacrylamide were used. In addition, the polyvinylpyrrolidone was added 75 minutes after a temperature of 80° C. had been reached.

COMPARATIVE EXAMPLE 1

The procedure was similar to that of Example 5, but 14600 g of styrene were used as the only monomer. In addition, the polyvinylpyrrolidone was added 115 minutes after a temperature of 80° C. had been reached, and the pentane was added after a further 80 minutes.

COMPARATIVE EXAMPLE 2

A mixture of 13375 g of styrene, 725 g of N-p-tolylmaleimide, 18.53 g of dibenzoyl peroxide and 34.8 g of t-butyl perbenzoate were added to a mixture of 16 kg of water, 16 g of $Na_4P_2O_7$ and 25.6 g of $MgSO_4 \cdot 7H_2O$ in a pressure-tight reactor having a capacity of 40 l. The mixture was heated, with stirring, to 85° C. over the course of 3 hours and subsequently to 115° C. over the course of 5 hours, and was kept at this temperature for a further 5 hours. 80 minutes after a temperature of 80° C. had been reached, 532.5 g of a 10% strength aqueous solution of polyvinylpyrrolidone (K value 90) were added. After a further 115 minutes, 1056 g of pentane were added to the reactor.

After prefoaming, the beads obtained had holes in the surface and a coarse cell structure in the interior.

COMPARATIVE EXAMPLE 3

The procedure was similar to that of Comparative Example 2, but 13050 g of styrene, 1450 g of N-p-tolylmaleimide and 710 g of a 10% strength aqueous solution of polyvinylpyrrolidone were used. It was necessary to add the polyvinylpyrrolidone only 5 minutes after a temperature of 80° C. had been reached in order to avoid the polymer batch coagulating. Some of the beads obtained had large holes in the surface, and foaming was poor, even using superheated steam. After the steam treatment, they had an irregular, coarse cell structure. Moldings were impossible to obtain due to lack of welding of the beads.

COMPARATIVE EXAMPLE 4

The procedure was similar to that of Comparative Example 2, but 12325 g of styrene and 2175 g of N-p-tolylmaleimide were used. In addition, it was necessary to add the polyvinylpyrrolidone immediately after a temperature of 80° C. had been reached.

Some of the beads were not completely round, had holes in the surface and could hardly be expanded at all, even using steam at 120° C. The beads obtained after the steam treatment had only very few cells, which were of different sizes.

COMPARATIVE EXAMPLES 5 TO 7

The expandable styrene polymers of Comparative Examples 5 to 7 were obtained by post-impregnating granules (1.5 mm) of mixtures of polystyrene (PS) (MW: 200 000) and polyphenylene ether (PPE) (MW: 40 000) having the composition given in Table 1 (MW=weight average molecular weight).

To this end, 530 g of tricalcium phosphate and 40 g of a 40% strength aqueous solution of a mixture of predominantly secondary sodium alkanesulfonates having a mean chain length of 15 carbon atoms (Mersolat® K30 from Bayer AG) were added to 21 kg of water in a pressure-tight reactor. 9 kg of the granulated PS/PPE mixture were added, and the reactor was sealed.

The reactor was flushed twice with 2 bar of nitrogen, and the contents were heated to 130° C. with stirring. When this temperature had been reached, 900 g of pentane were metered in continuously over a period of 2 hours. The mixture was then stirred at 130° C. for a further 10 hours and then cooled to room temperature, the pressure in the reactor was released, and the contents were discharged.

The results given in Table 2 show that moldings according to the invention which contain a styrene-methacrylamide copolymer in which the substituted methacrylamide component is copolymerized N-phenylmethacrylamide or N-cyclohexylmethacrylamide have a significantly greater heat distortion resistance (HDR) than do moldings containing only polystyrene. Although the softening point of the copolymer comprising 90% by weight of styrene and 10% by weight of N-p-tolylmaleimide is also above that of polystyrene, prefoaming using unpressurized or pressurized steam did not give the desired bulk density of from 15 to 30 g/l. In addition, the beads did not weld during the attempt to produce moldings, and the foam structure is very coarse.

By contrast, the expandable styrene polymers according to the invention have an outstanding expansion capacity. As the minimum achievable bulk densities show, the expansion capacity is surprisingly only slightly worse in view of the significantly higher softening points of the styrene-methacrylamide copolymers according to the invention compared with polystyrene.

EXAMPLES 9 TO 11

Foam boards measuring 40×40×5 cm and the densities 19.4 (Example 9), 23.4 (Example 10) and 26 kg/m³ (Example 11) were produced as described in Example 1 from the expandable styrene polymers of Example 8. The foam boards were each stored under standard conditions for two weeks and then at 60° C. for 3 days. The boards were cut to a thickness of 40 mm and their thermal conductivity was then measured in accordance with DIN 52 616 (heat-flow meter). The results are shown in Table 3.

EXAMPLES 12 TO 14

Foam boards measuring 20×20×40 cm were produced as described in Example 1 from the expandable styrene polymers of Examples 1 to 3. Their thermal conductivity was measured using an Anacon® instrument. The value of the 35.3 mW/(m*K) measured at the mean board temperature of 24° C. specified therein was converted to a mean board temperature of 10° C. corresponding to DIN 52616 by means of a computing program based on RS/1 from BBN. The values calculated in this way are shown in Table 3.

COMPARATIVE EXAMPLES 8 TO 10

Foam boards measuring 40×40×5 cm with the densities 19.5 (Comp. Ex. 8), 23.5 (Comp. Ex. 9) and 26 kg/m$^3$ (Comp. Ex. 10) were produced from the expandable styrene polymers of Comparative Example 1, and the thermal conductivities were measured as described in Example 9. The results are shown in Table 3.

COMPARATIVE EXAMPLES 11 TO 13

Foam boards measuring 40×40×5 cm with the densities 19.5 (Comp. Ex. 11), 23.5 (Comp. Ex. 12) and 26 kg/m$^3$ (Comp. Ex. 13) were produced from expandable styrene polymers obtained as described in Example 6, but using styrene as the only monomer, and the thermal conductivities were measured as described in Example 9. The results are shown in Table 3.

COMPARATIVE EXAMPLE 14

Expandable styrene polymers obtained by post-impregnation as described in Comp. Ex. 5 of granules (1.5 mm) comprising a mixture of 76% by weight of polystyrene (MW 200,000) and 24% by weight of polyphenylene ether (PPE) (MW 40,000), were prefoamed to a bulk density of 30 kg/m$^3$ in a Händle pressure-tight prefoaming box. The prefoamed particles were used to produce, as described in Example 9, a foam board having a density of 30 kg/m$^3$, and the thermal conductivity thereof was measured as described in Example 9 (cf. Table 3).

As Table 3 shows, foams based on the expandable styrene polymers according to the invention (Examples 9 to 14) have a lower thermal conductivity than those in which the parent polymer is polystyrene (Comparative Examples 8 to 13) or a polystyrene/polyphenylene ether (76/24) mixture (Comp. Ex. 14).

EXAMPLES 15 TO 17

The expandable styrene polymers of Example 3 (Ex. 15), 4 (Ex. 16) and 8 (Ex. 17) were each prefoamed and subsequently expanded to give foam boards having a density of 30 kg/m$^3$. Test specimens measuring 40×50×50 mm were cut out of each of these foam boards. These specimens were weighed and subsequently stored in diesel oil for 3 days under standard conditions. The results are shown in Table 4.

COMPARATIVE EXAMPLE 15

Oil-resistant, expandable styrene polymers as described in DE-A-39 01 329 based on a styreneacrylonitrile (SAN) copolymer having an acrylonitrile content of 6% by weight which had been prepared by suspension polymerization of styrene in which an SAN copolymer comprising 25% by weight of acrylonitrile and 75% by weight of styrene was dissolved were used to produce a foam board having a density of 15.5 kg/cm$^3$. The absorption of diesel oil of the latter was measured as described in Example 15 (cf. Table 4).

COMPARATIVE EXAMPLE 16

The absorption of diesel oil by the foam board of Comparative Example 14 was measured as described in Example 15 (cf. Table 4).

As shown by Table 4, foams based on the expandable styrene polymers according to the invention have good oil resistance.

TABLE 1

| Example No. | Monomer composition ||||| |
| --- | --- | --- | --- | --- | --- |
| | Styrene % by wt. | N-Phenylmeth-acrylamide % by wt. | N-Cyclohexylmeth-acrylamide % by wt. | N-Tolylmale-imide % by wt. | PPE % by wt |
| 1, 12 | 90 | 10 | — | — | — |
| 2, 13 | 85 | 15 | — | — | — |
| 3, 14–15 | 80 | 20 | — | — | — |
| 4, 16 | 70 | 30 | — | — | — |
| 5 | 90 | 10 | — | — | — |
| 6 | 90 | 10 | — | — | — |
| 7 | 80 | — | 20 | — | — |
| 8–11, 17 | 70 | — | 30 | — | — |
| 1 (comp.) | 100 | — | — | — | — |
| 2 (comp.) | 95 | — | — | 5 | — |
| 3 (comp.) | 90 | — | — | 10 | — |
| 4 (comp.) | 85 | — | — | 15 | — |
| 5 (comp.) | 90 | — | — | — | 10 |
| 6 (comp.) | 80 | — | — | — | 20 |
| 7 (comp.) | 70 | — | — | — | 30 |

TABLE 2

| Example No. | Minimum bulk density g/l | HDR °C. | MVI (210/10) ml/10 min | Vicat B °C. | d' mm | β o | Viscosity ml/g |
| --- | --- | --- | --- | --- | --- | --- | --- |
| 1 | 14.1 | 113 | 65.9 | 104.6 | 1.29 | 19.4 | 77.5 |
| 2 | 19.0 | 117 | 40.9 | 108.3 | 1.41 | 15.6 | 75.5 |
| 3 | 27.0 | 118 | 25.0 | 100.9 | 1.33 | 21.0 | 71.3 |

TABLE 2-continued

| Example No. | Minimum bulk density g/l | HDR °C. | MVI (210/10) ml/10 min | Vicat B °C. | d' mm | β o | Viscosity ml/g |
|---|---|---|---|---|---|---|---|
| 4 | 41.8 | 126 | 17.8 | 119.1 | 0.98 | 21.2 | 63.6 |
| 5 | 13.1 | 110 | 83.6 | 109.2 | 2.18 | 19.1 | 80.5 |
| 6 | 18.5 | 113 | 46.8 | 106.0 | 0.79 | 17.4 | 80.5 |
| 7 | 15.9 | 118 | 119.1 | 110.1 | 1.21 | 18 | 75.6 |
| 8 | 23.2 | 128 | 66.8 | 113.3 | 0.96 | 17.6 | 74.9 |
| 1 (comp.) | 11.4 | 104 | — | 100.8 | 1.9 | 20.2 | 75.2 |
| 2 (comp.) | 16.8 | 96 | 48.8 | 97.0 | 1.36 | 19.3 | 80.8 |
| 3 (comp.) | 99.2 | — | 31.3 | 101.6 | 1.49 | 15.9 | — |
| 4 (comp.) | 579.0 | — | 16.4 | 101.0 | 2.92 | 18.7 | — |
| 5 (comp.) | 20.0 | 116 | — | 107.0 | (1.5) | — | — |
| 6 (comp.) | 35.0 | 121 | 15.4 (220/10) | 113.5 | (1.5) | — | — |
| 7 (comp.) | 65.0 | 132 | 5.5 (220/10) | 123 | (1.5) | — | — |

TABLE 3

| Example No. | Foam density [kg/m$^3$] | Thermal conductivity [mW*m$^{-1}$*K$^{-1}$] |
|---|---|---|
| 9 | 19.4 | 33.6 |
| 10 | 23.4 | 31.8 |
| 11 | 26 | 31.0 |
| 12 | 17.5 | 33.1 |
| 13 | 24.4 | 31.7 |
| 14 | 20 | 31.6 |
| 8 (Comp.) | 19.5 | 34.9 |
| 9 (Comp.) | 23.5 | 33.7 |
| 10 (Comp.) | 26 | 33.3 |
| 11 (Comp.) | 19.5 | 36.3 |
| 12 (Comp.) | 23.5 | 34.8 |
| 13 (Comp.) | 26 | 34.2 |
| 14 (Comp. | 30 | 34.0 |

TABLE 4

| Example | dL [%] | dW [%] | dH [%] | Oil absorption [vol.-%] |
|---|---|---|---|---|
| 15 | −0.47 | −0.21 | 0.33 | 3.93 |
| 16 | −0.05 | −0.02 | 0.01 | 3.59 |
| 17 | 0.0 | −0.1 | 0.11 | 3.22 |
| 15 (Comp.) | 0.05 | 0.02 | 0.01 | 3.6 |
| 16 (Comp.) | 0.17 | 0.66 | 0.13 | 14.2 |

We claim:

1. A foam having a density of from 0.01 to 0.2 g/cm$^3$, comprising a) from 0 to 90% by weight of a styrene polymer or styrene copolymer other than b) containing at least 50% by weight of copolymerized styrene, b) from 10 to 100% by weight of a styrene/methacrylamide copolymer comprising from 0.5 to 50% by weight of at least one copolymerized N-substituted methacrylamide of the formula I

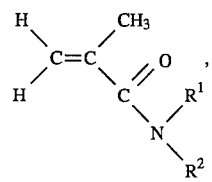

where $R^1$ and $R^2$ are identical or different and are hydrogen, $C_1$- to $C_{15}$-alkyl, $C_6$- to $C_{16}$-cycloalkyl or $C_6$- to $C_{20}$-aryl, it being possible, if $R^1$ and $R^2$ contain at least 2 carbon atoms, for at least 2 carbon atoms to be linked via hetero atoms.

* * * * *